US010180175B2

United States Patent
Hagihara (10) Patent No.: US 10,180,175 B2
(45) Date of Patent: Jan. 15, 2019

(54) DYNAMIC VIBRATION ABSORBING DEVICE

(71) Applicant: EXEDY Corporation, Neyagawa-shi, Osaka (JP)

(72) Inventor: Yoshiyuki Hagihara, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 15/535,867

(22) PCT Filed: Nov. 13, 2015

(86) PCT No.: PCT/JP2015/081920
§ 371 (c)(1),
(2) Date: Jun. 14, 2017

(87) PCT Pub. No.: WO2016/117214
PCT Pub. Date: Jul. 28, 2016

(65) Prior Publication Data
US 2017/0328444 A1    Nov. 16, 2017

(30) Foreign Application Priority Data
Jan. 21, 2015   (JP) ................................. 2015-009511

(51) Int. Cl.
*F16F 15/14*     (2006.01)
*F16H 45/02*     (2006.01)
*F16H 39/42*     (2006.01)

(52) U.S. Cl.
CPC ......... *F16F 15/1414* (2013.01); *F16H 39/42* (2013.01); *F16H 45/02* (2013.01);
(Continued)

(58) Field of Classification Search
CPC .... F16F 15/14; F16F 15/1414; F16F 15/1421; F16H 45/02; F16H 2045/0226; F16H 2045/0284
(Continued)

(56) References Cited

U.S. PATENT DOCUMENTS 4,842,117 A *   6/1989   Fukushima ......... F16F 15/1207
                                                          192/214.1
6,068,096 A *   5/2000   Morita .................. F16F 15/124
                                                              192/212
(Continued)

FOREIGN PATENT DOCUMENTS

| CN | 101349342 A | 1/2009 |
| CN | 101523078 A | 9/2009 |

(Continued)

OTHER PUBLICATIONS

International Search Report dated Dec. 15, 2015 for corresponding foreign Application No. PCT/JP2015/081920, 2 pp.
(Continued)

*Primary Examiner* — David H Bollinger
(74) *Attorney, Agent, or Firm* — United IP Counselors, LLC (57) ABSTRACT

A dynamic vibration absorbing device for an automobile can be on an output-side member of a torque converter. The dynamic vibration absorbing device includes a rotary member, a mass part, and an elastic member. The rotary member is fixed to the output-side member. The rotary member can be rotated about a rotational center of the output-side member. The mass part includes a first accommodation part. The mass part is for attenuating vibration of the output-side member by rotating about the rotational center relative to the rotary member. The elastic member is held by the first accommodation part. The elastic member elastically couples the rotary member and the mass part in a rotational direction.

(Continued)

The elastic member is for generating a hysteresis torque by sliding against the first accommodation part in rotation of the rotary member.

9 Claims, 4 Drawing Sheets

(52) U.S. Cl.
CPC ............... *F16H 2045/0226* (2013.01); *F16H 2045/0284* (2013.01)

(58) Field of Classification Search
USPC ........................................................ 74/574.2
See application file for complete search history.

(56) References Cited

U.S. PATENT DOCUMENTS

| | | | |
|---|---|---|---|
| 2011/0287844 A1* | 11/2011 | Steinberger | F16F 15/13492 464/68.8 |
| 2012/0217113 A1 | 8/2012 | Kawahara et al. | |
| 2013/0126285 A1* | 5/2013 | Loew | F16F 15/1442 188/379 |
| 2014/0026712 A1* | 1/2014 | Movlazada | F16F 15/145 74/574.2 |
| 2014/0353105 A1 | 12/2014 | Tomiyama | |
| 2015/0354665 A1* | 12/2015 | Asai | F16H 45/02 464/68.9 |
| 2016/0102744 A1* | 4/2016 | Kawahara | F16F 15/12366 192/213.1 |
| 2016/0160958 A1* | 6/2016 | Hennebelle | F16F 15/12353 192/3.28 |
| 2016/0327142 A1* | 11/2016 | Takikawa | F16F 15/14 |

FOREIGN PATENT DOCUMENTS

| | | |
|---|---|---|
| CN | 103547835 A | 1/2014 |
| CN | 104220782 A | 12/2014 |
| JP | 2009293671 A | 12/2009 |
| JP | 2011099488 A | 5/2011 |
| JP | 2013160322 A | 8/2013 |
| JP | 2013256963 A | 12/2013 |
| JP | 2014-152838 A | 8/2014 |
| JP | 2014163456 A | 9/2014 |
| WO | 2005/071283 A1 | 8/2005 |
| WO | 2007/105684 A1 | 9/2007 |
| WO | 2014132906 A1 | 9/2014 |

OTHER PUBLICATIONS

First Office Action of the corresponding Chinese patent application No. 201580072245.8, dated Jul. 23, 2018, 6 pp.
Notice of Allowance of the corresponding Japanese patent application No. 2015-009511, dated Oct. 2, 2018, 3 pp.

* cited by examiner

DYNAMIC VIBRATION ABSORBING DEVICE

CROSS-REFERENCE TO RELATED APPLICATIONS

This application is the U.S. National Phase of PCT International Application No. PCT/JP2015/081920, filed on Nov. 13, 2015. That application claims priority to Japanese Patent Application No. 2015-009511, filed Jan. 21, 2015. The contents of both applications are herein incorporated by reference in their entirety.

BACKGROUND

Technical Field

The present disclosure relates to a dynamic vibration absorbing device for an automobile.

Background Art

Torque converters are provided with a lock-up device (see Japan Laid-open Patent Application Publication No. 2009-293671). In the lock-up device, an inertia member is attached to an output member fixed to a turbine hub, while being rotatable relatively thereto. Additionally, torsion springs are provided as elastic members between the output member and the inertia member.

Thus, in the lock-up device, the inertia member is coupled to the output member through the torsion springs. Hence, the inertia member and the torsion springs function as a dynamic damper. Fluctuations in rotation transmitted from a turbine to the turbine hub are attenuated by the dynamic damper.

BRIEF SUMMARY

The well-known dynamic damper attenuates torque fluctuations when a torque of the turbine is outputted to an input shaft through the turbine hub. This type of dynamic damper is often used when the stiffness of a member coupled to the input shaft is high, for instance, when front-wheel drive is employed or so forth. Here, the member coupled to the input shaft is a member that transmits a torque to a transmission.

On the other hand, when the stiffness of the member coupled to the input shaft is low, for instance, when rear-wheel drive is employed or so forth, it is concerned that resonance of the turbine occurs due to lowness of the stiffness. In this case, a vibration frequency intended to be attenuated by the well-known dynamic damper is different from a resonant frequency of the turbine. Hence, it is difficult for the well-known dynamic damper to attenuate torque fluctuations attributed to resonance of the turbine.

The present disclosure has been made in view of the aforementioned drawback. It is an object of the present disclosure to provide a dynamic vibration absorbing device capable of effectively attenuating torque fluctuations of an output-side member of a torque converter.

(1) A dynamic vibration absorbing device for an automobile according to an aspect of the present disclosure is provided on an output-side member of a torque converter. The present dynamic vibration absorbing device includes a rotary member, a mass part and an elastic member. The rotary member is fixed to the output-side member and is rotated about a rotational center of the output-side member. The mass part includes a first accommodation part. The mass part attenuates vibration of the output-side member by rotating about the rotational center in relative to the rotary member. The elastic member is held by the first accommodation part. The elastic member elastically couples the rotary member and the mass part in a rotational direction. The elastic member generates a hysteresis torque by sliding against the first accommodation part in rotation of the rotary member.

In the present dynamic vibration absorbing device, the rotary member is fixed to the output-side member of the torque converter. Additionally, in rotation of the rotary member, the mass part is moved relatively to the rotary member through the elastic member, whereby torque fluctuations of the output-side member of the torque converter can be directly attenuated.

Here, torque fluctuations of the output-side member of the torque converter, when attenuated in the present dynamic vibration absorbing device, partially increases in the vicinity of an intended rotational speed targeted by the present dynamic vibration absorbing device.

However, in the present dynamic vibration absorbing device, when the rotary member is rotated while the elastic member is held by the first accommodation part of the mass part, the elastic member and the first accommodation part of the mass part slide against each other, whereby a hysteresis torque is generated. Thus, in the present dynamic vibration absorbing device, the partially increased toque fluctuations of the output-side member of the torque converter can be attenuated by the hysteresis torque.

Thus, in the present dynamic vibration absorbing device, principal torque fluctuations of the output-side member of the torque converter can be directly attenuated, and simultaneously, subsidiary torque fluctuations occurring by attenuation of the principal torque fluctuations can be also attenuated. In other words, in the present dynamic vibration absorbing device, torque fluctuations of the output-side member of the torque converter can be effectively reduced.

(2) A dynamic vibration absorbing device for an automobile according to another aspect of the present disclosure may be configured as follows. The hysteresis torque is set to be greater than or equal to 2 Nm and less than or equal to 30 Nm.

In this case, the hysteresis torque is set to be greater than or equal to 2 Nm and less than or equal to 30 Nm. Hence, compared to a well-known dynamic vibration absorbing device, torque fluctuations, subsidiarily occurring in the output-side member of the torque converter, can be effectively attenuated in a high rotational speed range.

(3) A dynamic vibration absorbing device for an automobile according to yet another aspect of the present disclosure may be configured as follows. The mass part has a smaller mass than the output-side member of the torque converter.

In this case, the inertia of the mass part is set to be smaller than that of the turbine of the torque converter. For example, when the inertia of the mass part is increased, it is possible to enhance an attenuation effect on the principal torque fluctuations in the intended rotational speed. On the other hand, it is concerned that the subsidiary torque fluctuations in the vicinity of the intended rotational speed increase with increase in inertia of the mass part. Therefore, it is effective to set the inertia of the mass part to be smaller than that of the turbine in order to attenuate the principal torque fluctuations without, as much as possible, increasing the subsidiary torque fluctuations. In other words, with this configuration, it is possible to inhibit increase in subsidiary torque fluctuations occurring in attenuation of the principal torque fluctuations.

(4) A dynamic vibration absorbing device for an automobile according to yet another aspect of the present disclosure may be configured as follows. The rotary member includes a second accommodation part in which the elastic member is capable of being disposed. The mass part is disposed on both sides of the rotary member in an extending direction of the rotational center.

In this case, the elastic member is held only by the first accommodation part of the mass part on both sides of the rotary member, while being disposed in the second accommodation part of the rotary member. Accordingly, a hysteresis torque can be stably generated while the elastic member is reliably held by the first accommodation part of the mass part.

(5) A dynamic vibration absorbing device for an automobile according to yet another aspect of the present disclosure may be configured as follows. The first accommodation part includes a flange part. The flange part holds the elastic member and is capable of sliding against the elastic member.

In this case, a hysteresis torque can be more stably generated while the elastic member is reliably held by the flange part of the first accommodation part of the mass part.

(6) A dynamic vibration absorbing device for an automobile according to yet another aspect of the present disclosure may be configured as follows. The second accommodation part of the rotary member includes a contact part with which the elastic member makes contact in the rotational direction. The contact part is formed along a straight line extending from the rotational center in a radial direction.

In this case, when the mass part is rotated relatively to the rotary member, the elastic member is pressed by the contact part of the second accommodation part of the rotary member while being held by the first accommodation part of the mass part. Accordingly, the elastic member is compressed. Here, the contact part is formed along the straight line extending from the rotational center in the radial direction. Therefore, when pressed by the contact part, the elastic member becomes likely to deflect in a direction separating from the rotational center, and slides against the first accommodation part of the mass part. Accordingly, a hysteresis torque can be more stably generated.

According to the present disclosure, torque fluctuations of an output-side member of a torque converter can be effectively reduced in a dynamic vibration absorbing device.

DETAILED DESCRIPTION OF EMBODIMENTS

Figure 1:
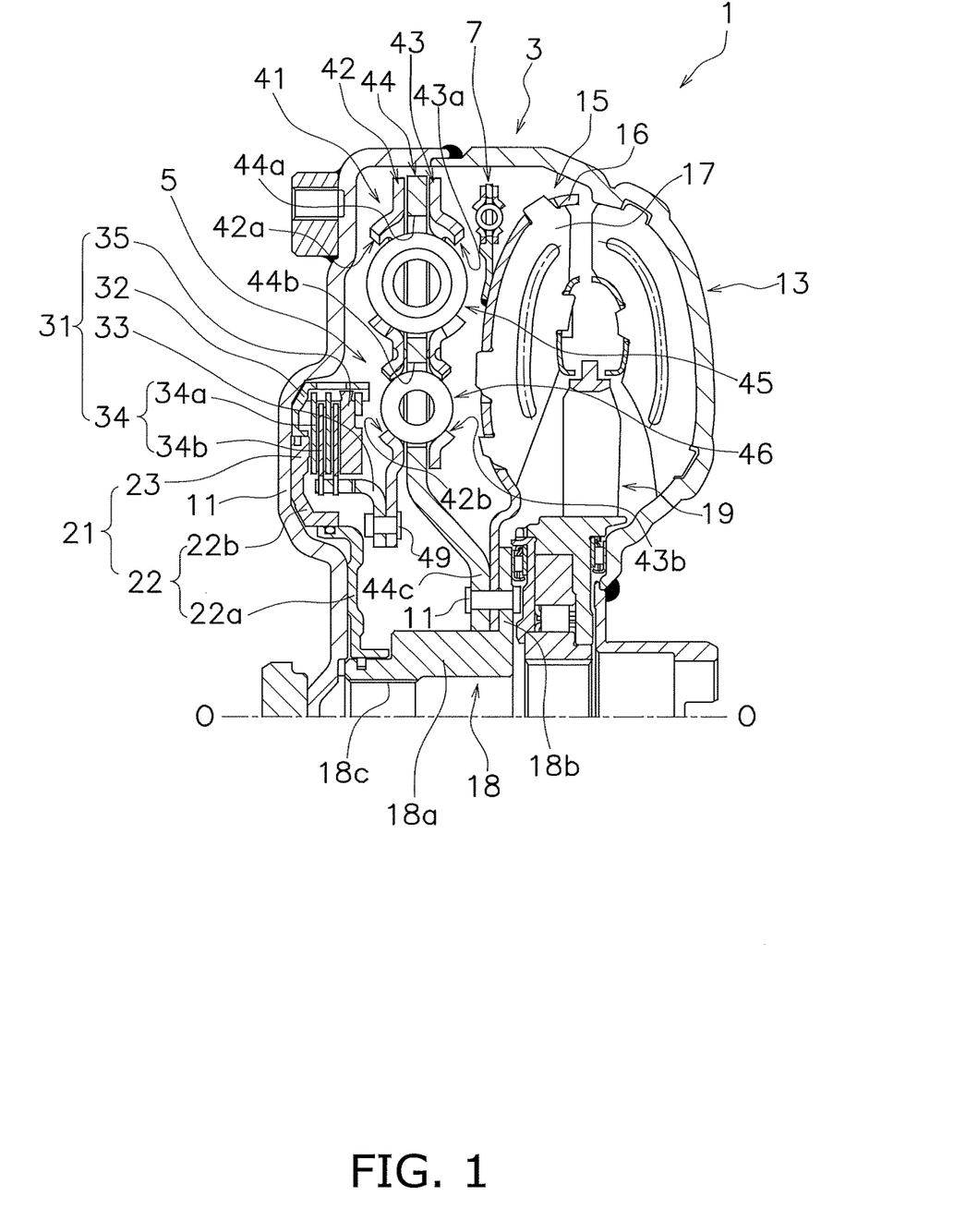
FIG. 1 is a cross-sectional view of a torque converter including a dynamic damper device according to an exemplary embodiment of the present disclosure.

[Torque Converter]
FIG. 1 shows a torque converter 1 according to an exemplary embodiment of the present disclosure. In FIG. 1, an engine is disposed on the left side, whereas a transmission is disposed on the right side. Line O-O depicted in FIG. 1 is a rotational axis (an exemplary rotational center) of the torque converter 1.

The torque converter 1 is a device that transmits a torque from the engine to the transmission. The torque converter 1 mainly includes a torque converter body 3, a lock-up device 5 and a dynamic damper device 7.

<Torque Converter Body>
As shown in FIG. 1, the torque converter body 3 includes a front cover 11 into which a power is inputted, an impeller 13, a turbine 15 (an exemplary output-side member) and a stator 19.

The outer peripheral part of the front cover 11 and that of the impeller 13 are welded to each other. A fluid chamber is formed by the front cover 11 and the impeller 13.

The turbine 15 is disposed in opposition to the impeller 13 within the fluid chamber. The turbine 15 includes a turbine shell 16, a plurality of turbine blades 17 fixed to the inside of the turbine shell 16, and a turbine hub 18 fixed to the inner peripheral part of the turbine shell 16.

The turbine hub 18 includes a tubular part 18a and a flange part 18b extending radially outward from the tubular part 18a. The inner peripheral part of the turbine shell 16 is fixed to the outer peripheral part of the flange part 18b by a rivet(s) 11. It should be noted that the turbine hub 18 includes a spline hole 18c in the inner peripheral part thereof. An input shaft, transmitting a torque to the transmission (not shown in the drawings), is coupled to the spline hole 18c.

The stator 19 regulates the flow of hydraulic oil from the turbine 15 to the impeller 13. The stator 19 is disposed axially between the inner peripheral part of the impeller 13 and that of the turbine 15.

<Lock-Up Device>
The lock-up device 5 is disposed between the front cover 11 and the turbine 15. The lock-up device 5 includes a piston 21, a clutch part 31 and a damper mechanism 41.

The piston 21 is axially movable. Detailedly, the piston 21 is axially movable by difference between a hydraulic pressure in a space between the piston 21 and the front cover 11 and that in a space between the piston 21 and the damper mechanism 41.

The piston 21 includes a body 22 and a pressing part 23. The body 22 has a substantially annular shape. The body 22 includes a first body 22a and a second body 22b.

The inner peripheral part of the first body 22a is disposed on the outer peripheral part of the turbine hub 18. The inner peripheral part of the first body 22a is supported by the outer peripheral surface of the turbine hub 18 while being axially movable thereon and being rotatable relatively thereto. A seal member is disposed between the inner peripheral part of the first body 22a and the outer peripheral surface of the turbine hub 18.

The inner peripheral part of the second body 22b is supported by the outer peripheral part of the first body 22a while being axially movable thereon and being rotatable relatively thereto. A seal member is disposed between the inner peripheral part of the second body 22b and the outer peripheral part of the first body 22a. The outer peripheral end of the second body 22b is supported by the inner peripheral part of a fixed part to be described, while being axially movable thereon. A seal member is disposed between the outer peripheral part of the second body 22b and the inner peripheral part of the fixed part.

The pressing part 23 is integrated with the body and axially protrudes therefrom. Detailedly, the pressing part 23 is integrated with the second body 22b and axially protrudes therefrom. More detailedly, the pressing part 23 protrudes from the outer peripheral part of the second body 22b toward the damper mechanism.

The clutch part 31 includes a fixed part 32, a torque transmission part 33, a plurality of friction members 34 and a positioning member 35. The fixed part 32 is fixed to the front cover 11. The torque transmission part 33 is disposed in opposition to the fixed part 32 on the inner peripheral side of the fixed part 32.

Each of the plural friction members 34 has a substantially annular shape. The plural friction members 34 are disposed between the fixed part 32 and the torque transmission part 33. The plural friction members 34 include a plurality of first friction members 34a and a plurality of second friction members 34b. The first friction members 34a and the second friction members 34b are disposed axially in adjacent to each other. The plural first friction members 34a are engaged with the fixed part 32 and are axially movable. The plural second friction members 34b are engaged with the torque transmission part 33 and are axially movable.

The positioning member 35 is a component that positions the friction members 34. The positioning member 35 has a substantially annular shape. The positioning member 35 is fixed to an axial end (an end on the opposite side of a fixed end) of the fixed part 32. The plural friction members 34 are disposed axially between the positioning member 35 and the piston 21 (the pressing part 23).

The damper mechanism 41 includes a pair of retaining plates 42 and 43, an output flange 44, a plurality of first and second torsion springs 45 and 46 (outer peripheral side torsion springs 45 and inner peripheral side torsion springs 46).

The pair of retaining plates 42 and 43 is a pair of annularly shaped disc members disposed axially in opposition to each other at an interval. The pair of retaining plates 42 and 43 includes a plurality of spring accommodation parts 42a, 43a in the outer peripheral parts thereof and includes a plurality of spring accommodation parts 42b, 43b in the inner peripheral parts thereof.

The outer peripheral parts of the pair of retaining plates 42 and 43 are fixed to each other by a fixation member (s) such as a rivet (s) (not shown in the drawings). The inner peripheral part of one retaining plate 42 more extends to the inner peripheral side than that of the other retaining plate 43. The inner peripheral part of the one retaining plate 42 is fixed to the clutch part 31, for instance, the torque transmission part 33 by a fixation member(s) such as a rivet(s) 49.

The output flange 44 is disposed axially between the pair of retaining plates 42 and 43. The output flange 44 includes first and second openings 44a and 44b for accommodating springs in the outer peripheral part and inner peripheral part thereof. An inner peripheral end 44c of the output flange 44 is fixed to the flange part 18b of the turbine hub 18 by the rivet(s) 11.

The first torsion springs 45 (outer peripheral side torsion springs) are disposed in the outer peripheral side first openings 44a of the output flange 44, while being supported by the outer peripheral side spring accommodation parts 42a and 43a of the pair of retaining plates 42 and 43. The second torsion springs 46 (inner peripheral side torsion springs) are disposed in the inner peripheral side second openings 44b of the output flange 44, while being supported by the inner peripheral side spring accommodation parts 42b and 43b of the pair of retaining plates 42 and 43.

<Dynamic Damper Device 7>

The dynamic damper device 7 attenuates torque fluctuations in a predetermined rotational speed range. Here, the dynamic damper device 7 is set to be capable of attenuating torque fluctuations in a high rotational speed range.

Figure 2:
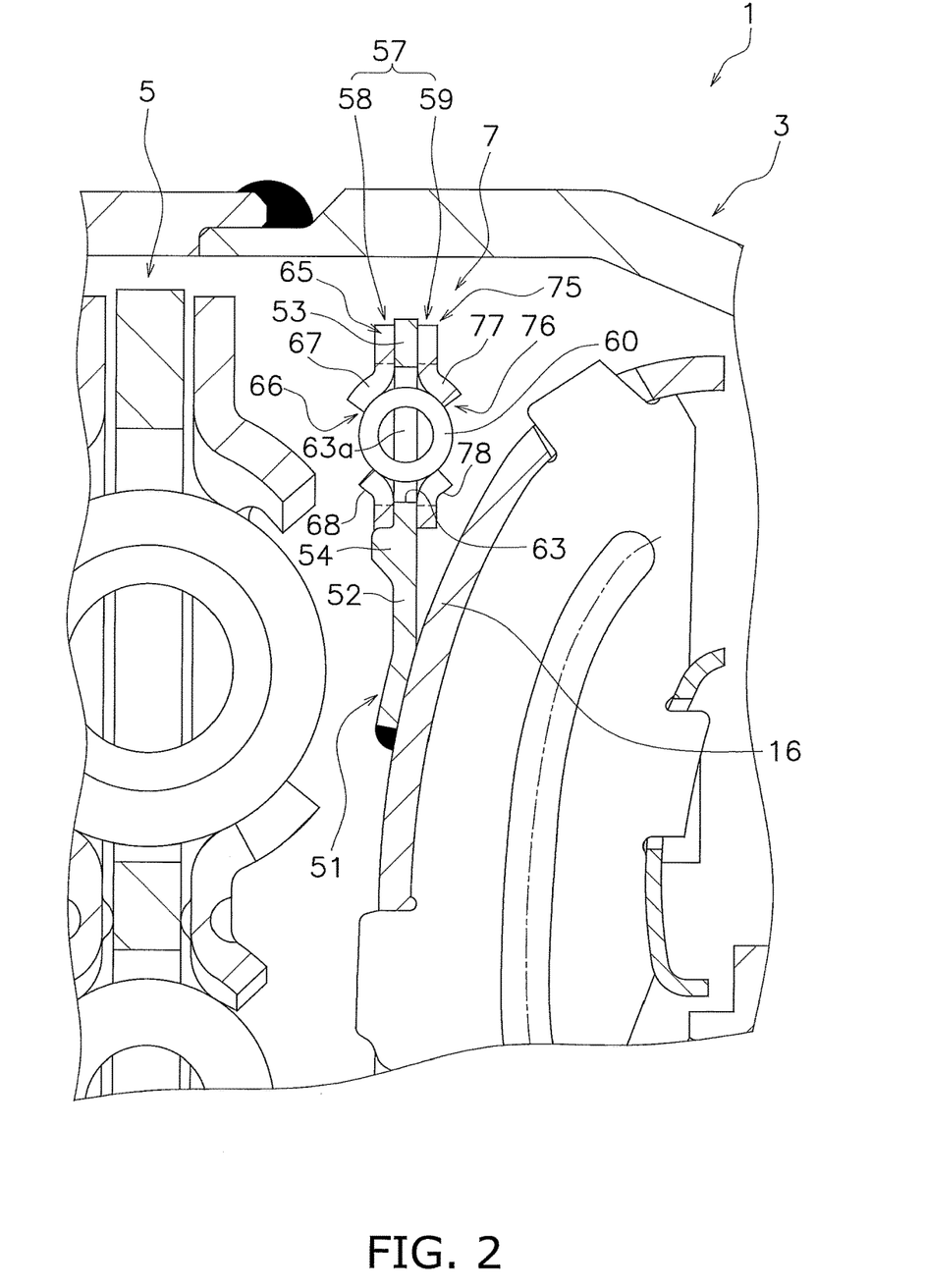
FIG. 2 is an enlarged cross-sectional view of the dynamic damper device in FIG. 1.

As shown in FIG. 2, the dynamic damper device 7 is attached to the torque converter body 3, for instance, the turbine shell 16. The dynamic damper device 7 includes a damper plate 51 (an exemplary rotary member), a pair of inertia rings 57 (an exemplary mass part) and a plurality of third torsion springs 60 (an exemplary elastic member).

Figure 3:
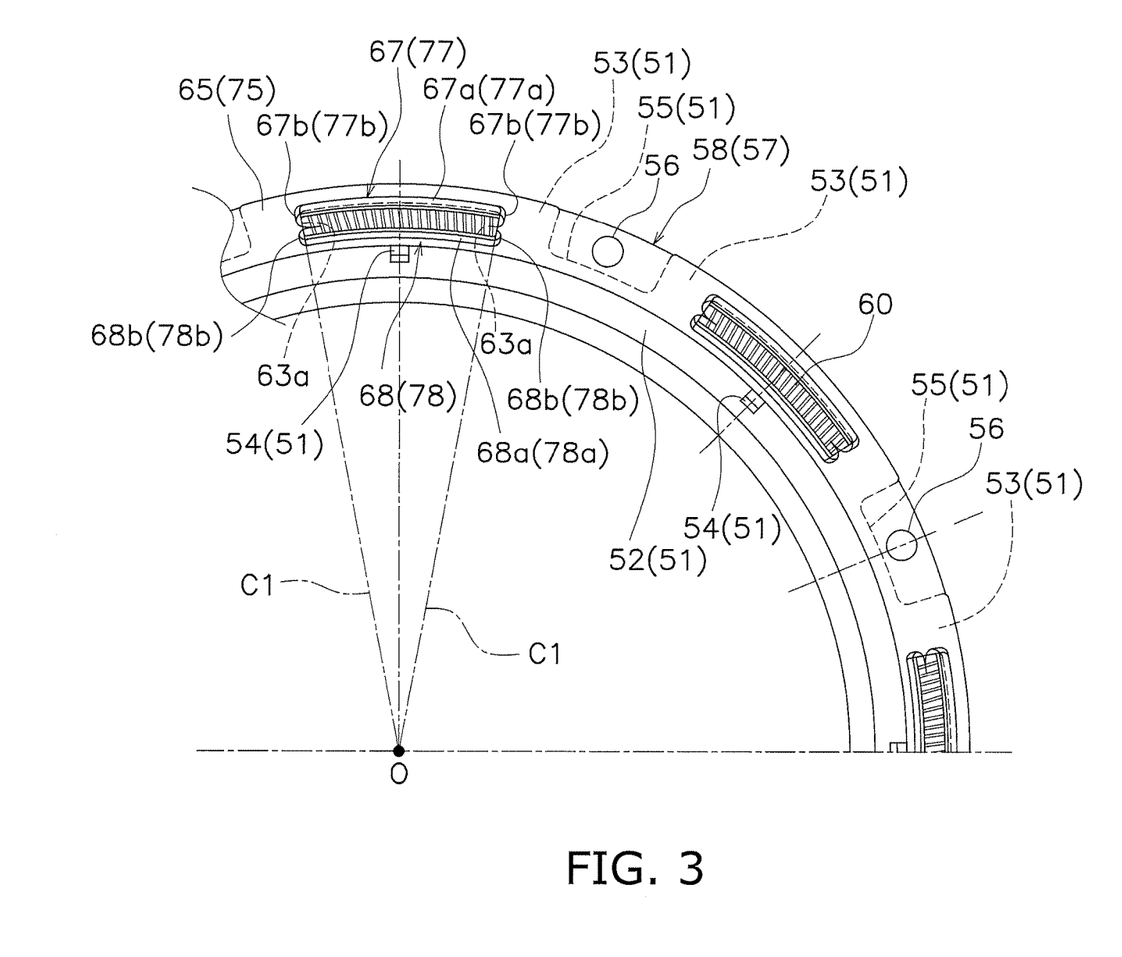
FIG. 3 is a front view of the dynamic damper device in FIG. 1 as seen from an engine side.

As shown in FIGS. 2 and 3, the damper plate 51 is a disc member having a substantially annular shape. The damper plate 51 includes a disc part 52 having an annular shape, a plurality of spring placement parts 53 and a plurality of support protrusions 54. The inner peripheral end of the disc part 52 is fixed to the turbine shell 16. For example, as shown in FIG. 2, the inner peripheral end of the disc part 52 is fixed to the turbine shell 16 by welding. As shown in FIG. 3, the respective plural spring placement parts 53 are integrated with the disc part 52 and protrude radially outward therefrom. The respective spring placement parts 53 are provided at predetermined intervals in the circumferential direction. In other words, recesses 55 are provided, each being interposed between circumferentially adjacent spring placement parts 53.

Each spring placement part 53 (an exemplary second accommodation part) includes a third opening 63 for spring placement. Each third torsion spring 60 is disposed in the third opening 63. The ends of each third torsion spring 60 are contactable to a pair of opening edges 63a (a pair of circumferential edges; an exemplary contact part) circumferentially opposed to each other in each third opening 63. Each of the pair of opening edges 63a is formed along a straight line C1 radially extending from a rotational axis of the torque converter 1 (see FIG. 3). Predetermined intervals are produced between a pair of radially opposed wall parts in each third opening 63 and the outer peripheral part of each third torsion spring 60.

The plural support protrusions 54 position the inertia rings 57 in the radial direction. Detailedly, the plural support protrusions 54 position one of the pair of inertia rings 57 (a first inertia ring 58 to be described) in the radial direction. The plural support protrusions 54 protrude from the disc part 52 toward the lock-up device 5. The respective plural support protrusions 54 are integrated with the disc part 52 while being circumferentially aligned at predetermined intervals.

As shown in FIGS. 2 and 3, the pair of inertia rings 57 is coupled to the damper plate 51 through the third torsion springs 60. In other words, rotation of the pair of inertia rings 57 relative to the damper plate 51 is controlled by the third torsion springs 60. Resonance of the torque converter 1 is inhibited by this control.

Here, the inertia of the pair of inertia rings 57 is set to be smaller than that of the turbine 15 of the torque converter 1 in order to effectively attenuate torque fluctuations in the high rotational speed range. For example, the inertia of the pair of inertia rings 57 is set to be one-twentieth of that of the turbine 15 of the torque converter 1.

The pair of inertia rings 57 is composed of the first inertia ring 58 and a second inertia ring 59. The first inertia ring 58 and the second inertia ring 59 are substantially annular members. The first inertia ring 58 and the second inertia ring 59 are rotatable relatively to the damper plate 51.

The first inertia ring 58 and the second inertia ring 59 are disposed axially at a predetermined interval. The damper plate 51 is disposed axially between the first inertia ring 58 and the second inertia ring 59. The first inertia ring 58 and the second inertia ring 59 are axially coupled to each other by fixation members such as rivets 56. The shafts of the rivets 56 are disposed in recesses 55 of the damper plate 51, respectively.

With this configuration, the first inertia ring 58 and the second inertia ring 59 are rotatable relatively to the damper plate 51 in the circumferential direction on both axial sides of the damper plate 51, while the first inertia ring 58 is supported by the support protrusions 54 of the damper plate 51.

Next, configurations of the first inertia ring 58 and the second inertia ring 59 will be explained.

The first inertia ring 58 includes a first ring body 65 and first window parts 66 (an exemplary first accommodation part). The first ring body 65 has a substantially annular shape. The first window parts 66 hold the third torsion springs 60, respectively, and are capable of sliding against the third torsion springs 60. A hysteresis torque attributed to slide resistance of the first window parts 66 and the third torsion springs 60 is set to be, for instance, in a range of greater than or equal to 2 Nm and less than or equal to 30 Nm. By thus setting the hysteresis torque, secondary torque fluctuations (to be described) can be effectively attenuated when occurring in the high rotational speed range.

The first window parts 66 are rectangular openings extending in the circumferential direction. Each first window part 66 includes a pair of first flange parts 67 and 68. For example, the pair of first flange parts 67 and 68 is provided radially in opposition to each other. Additionally, the pair of first flange parts 67 and 68 protrude toward the lock-up device 5.

More specifically, one first flange part 67 (an outer peripheral side flange part) includes an outer peripheral side circular-arc flange part 67a and outer peripheral side corner flange parts 67b. The outer peripheral side circular-arc flange part 67a circumferentially extends on the radially outer edge in each first window part 66. The outer peripheral side corner flange parts 67b cover the radially outer corners of the circumferentially opposed edges in each first window part 66.

The other first flange part 68 (an inner peripheral side flange part) includes an inner peripheral side circular-arc flange part 68a and inner peripheral side corner flange parts 68b. The inner peripheral side circular-arc flange part 68a circumferentially extends on the radially inner edge in each first window part 66. The inner peripheral side corner flange parts 68b cover the radially inner corners of the circumferentially opposed edges in each first window part 66.

The outer peripheral side corner flange parts 67b and the inner peripheral side corner flange parts 68b hold the ends of each third torsion spring 60. The outer peripheral side circular-arc flange part 67a and the inner peripheral side circular-arc flange part 68a are capable of sliding against each third torsion spring 60.

The second inertia ring 59 includes a second ring body 75 and second window parts 76 (an exemplary first accommodation part). The second ring body 75 has a substantially annular shape. The second window parts 76 hold the third torsion springs 60, respectively, and are capable of sliding against the third torsion springs 60.

The second window parts 76 are rectangular openings extending in the circumferential direction. Each second window part 76 includes a pair of second flange parts 77 and 78. For example, the pair of second flange parts 77 and 78 are provided radially in opposition to each other. Additionally, the pair of second flange parts 77 and 78 protrude toward the turbine 15.

Similarly to the pair of first flange parts 67 and 68, the pair of second flange parts 77 and 78 includes an outer peripheral side circular-arc flange part 77a, outer peripheral side corner flange parts 77b, an inner peripheral side circular-arc flange part 78a and inner peripheral side corner flange parts 78b. The outer peripheral side circular-arc flange part 77a, the outer peripheral side corner flange parts 77b, the inner peripheral side circular-arc flange part 78a and the inner peripheral side corner flange parts 78b do not directly appear on the drawing and are therefore indicated by reference numerals within parentheses in FIG. 3.

It should be noted that the configurations of the second flange parts 77 and 78 are the same as those of the first flange parts 67 and 68, excluding that the pair of second flange parts 77 and 78 protrude toward the turbine 15. Therefore, detailed explanation of the configurations of the second flange parts 77 and 78 will be herein omitted. The explanation herein omitted conforms to that of the first flange parts 67 and 68.

The plural third torsion springs 60 are disposed in the spring placement parts 53 of the damper plate 51, the first window parts 66 of the first inertia ring 58 and the second window parts 76 of the second inertia ring 59.

Detailedly, both ends of each third torsion spring 60 are contactable to the pair of opening edges 63a in each spring placement part 53 of the damper plate 51. Additionally, both ends of each third torsion spring 60 are held by each pair of outer peripheral side corner flange parts 67b, each pair of outer peripheral side corner flange parts 77b, each pair of inner peripheral side corner flange parts 68b and each pair of inner peripheral side corner flange parts 78b in the first inertia ring 58 and the second inertia ring 59, while making contact with these corner flange parts 67b, 77b, 68b and 78b. Moreover, the outer peripheral part of each third torsion spring 60 is capable of sliding against the outer peripheral side circular-arc flange parts 67a and 77a and the inner peripheral side circular-arc flange parts 68a and 78a in the first inertia ring 58 and the second inertia ring 59.

When the first inertia ring 58 and the second inertia ring 59 are rotated relatively to the damper plate 51, one of both ends of each third torsion spring 60 described above is compressed by one of the pair of opening edges 63a of the damper plate 51, while being held by the corner flange parts 67b, 77b, 68b and 78b in the first inertia ring 58 and the second inertia ring 59. In this case, the other of the pair of opening edges 63a of the damper plate 51 makes contact with the other of both ends of each third torsion spring 60.

[Actions of Torque Converter]

While the front cover 11 and the impeller 13 are rotated, the hydraulic oil flows from the impeller 13 to the turbine 15, and a power is transmitted from the impeller 13 to the turbine 15 through the hydraulic oil. The power transmitted to the turbine 15 is transmitted through the turbine hub 18 to the input shaft (not shown in the drawings) for transmitting a torque to the transmission.

When the rotational speed of the input shaft reaches a given constant speed, the lock-up device 5 is turned on, and a power is mechanically transmitted from the front cover 11 to the turbine hub 18 through the lock-up device 5. Specifically, the piston 21 is moved toward the transmission by change in hydraulic pressure, and the plural friction members 34 are interposed and held by the piston 21 (the pressing part 23) and the positioning member 35 of the clutch part 31. Accordingly, the power of the front cover 11 is transmitted from the torque transmission part 33 of the clutch part 31 to the pair of retaining plates 42 and 43. Then, the power is transmitted to the output flange 44 through the pair of retaining plates 42 and 43 and the outer peripheral side and inner peripheral side torsion springs 45 and 46, and is outputted to the turbine hub 18.

[Actions of Dynamic Damper Device]

The dynamic damper device 7 is attached to the torque converter body 3, for instance, the turbine shell 16. Due to this, torque fluctuations of the turbine 15 are inhibited by the dynamic damper device 7. The dynamic damper device 7 in the present exemplary embodiment will be hereinafter explained in detail.

Figure 4:
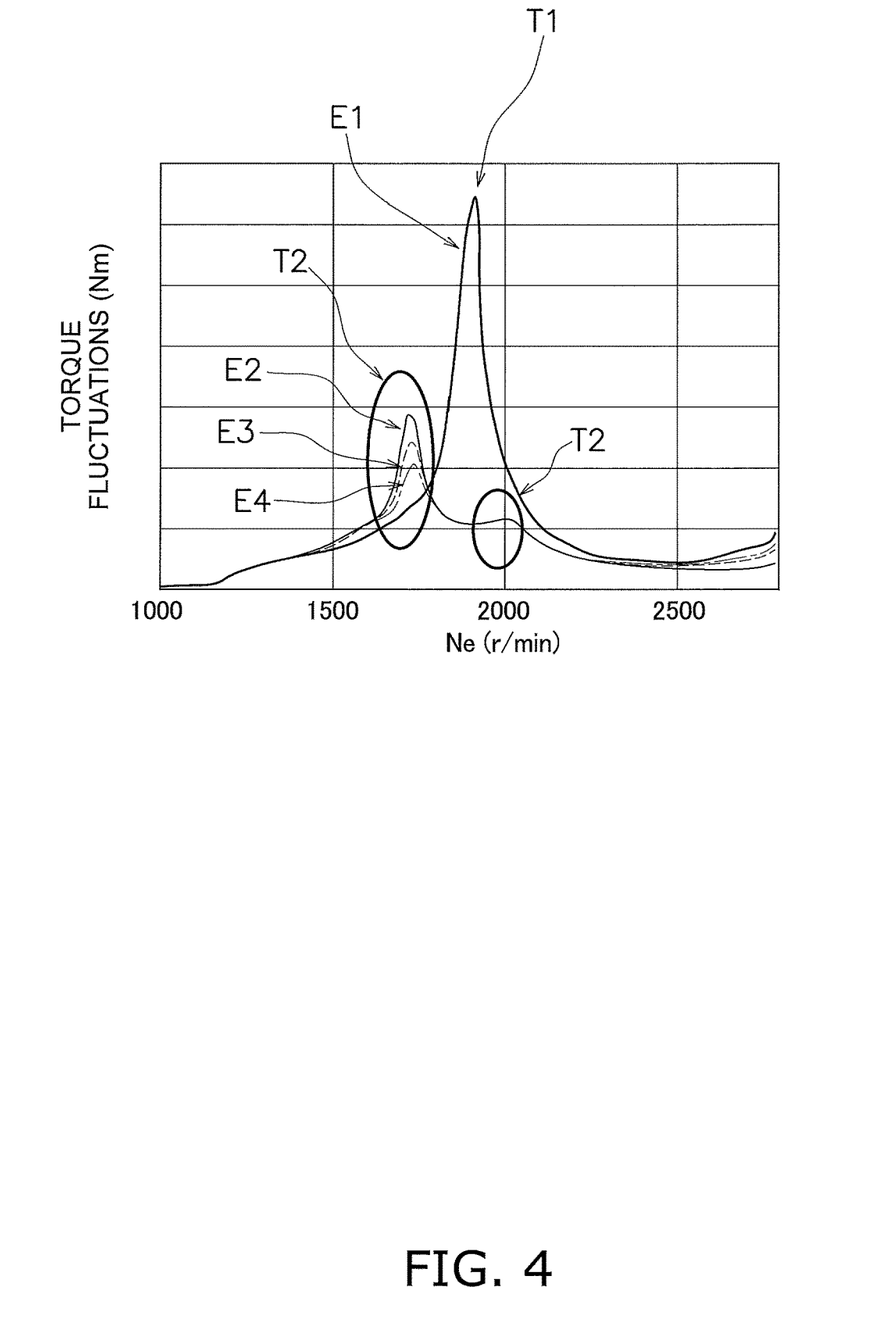
FIG. 4 is a chart for explaining characteristics of the dynamic damper device.

For example, when the dynamic damper device 7 is not installed, as shown in FIG. 4, there are chances of occurrence of torque fluctuations in the vicinity of a predetermined rotational speed range of the engine, for instance, in the vicinity of a high rotational speed range (1900 rpm) (see characteristic curve E1). The torque fluctuations are considered as being caused by resonance of the turbine 15 attributed to the stiffness of the input shaft, that of a member coupled to the input shaft, and/or so forth.

On the other hand, when the dynamic damper device 7 is installed, as shown in FIG. 4, the torque fluctuations (primary torque fluctuations T1) in the aforementioned high rotational speed range are attenuated by the dynamic damper device 7 (see characteristic curves E2 to E4). Thus, the present dynamic damper device 7 (e.g., the pair of inertia rings 57 and the plural third torsion springs 60) is set to be capable of effectively attenuating the primary torque fluctuations in the aforementioned high rotational speed range.

Here, in this case, the primary torque fluctuations T1 (exemplary principal torque fluctuations) at an intended rotational speed targeted by the dynamic damper device 7 can be attenuated, but toque fluctuations in the vicinity of the intended rotational speed, for instance, secondary torque fluctuations T2 (exemplary subsidiary torque fluctuations) in the vicinity of 1700 rpm and those in the vicinity of 2000 rpm partially increase (see e.g., characteristic curve E2). It should be noted that in FIG. 4, for instance, 1900 rpm is assumed as the intended rotational speed.

However, in the present dynamic damper device 7, each third torsion spring 60 slides against the first inertia ring 58 (the outer peripheral side circular-arc flange part 67a and the inner peripheral side circular-arc flange part 68a) and the second inertia ring 59 (the outer peripheral side circular-arc flange part 77a and the inner peripheral side circular-arc flange part 78a), whereby a hysteresis torque (a toque due to slide resistance) occurs. The aforementioned secondary torque fluctuations T2 are attenuated by the hysteresis torque (characteristic E3, characteristic E4).

Especially, among the secondary torque fluctuations T2, torque fluctuations on the low rotational speed side, for instance, those in the vicinity of 1700 rpm, are effectively attenuated. It should be noted that characteristic curve E2 is obtained when the hysteresis torque is not taken into consideration. On the other hand, the hysteresis torque in characteristic curve E3 and that in characteristic curve E4 are set to be, for instance, in a range of greater than or equal to 2 Nm and less than or equal to 30 Nm. Characteristic curve E3 and characteristic curve E4 are different in magnitude of hysteresis torque, and the hysteresis torque in characteristic E3 is smaller than that in characteristic E4.

When the rotational speed of the engine herein increases, the hysteresis torque also increases. Hence, among the secondary torque fluctuations T2, toque fluctuations on the high rotational speed side (e.g., torque fluctuations in the vicinity of 2000 rpm) are less affected by the magnitude of hysteresis torque.

Thus, the present dynamic damper device 7 attenuates the primary torque fluctuations T1 at the intended rotational speed by the inertia rings 57 and the third torsion springs 60, and attenuates the secondary torque fluctuations T2 occurring in attenuation of the primary torque fluctuations T1 by the hysteresis torque.

[Features]

(1) In the present dynamic damper device 7, the damper plate 51 is fixed to the turbine 15 of the torque converter 1. Additionally, in rotation of the damper plate 51, the inertia rings 57 are moved relatively to the damper plate 51 through the third torsion springs 60, whereby the primary torque fluctuations T1 of the turbine 15 can be directly attenuated.

Here, when the primary torque fluctuations T1 of the turbine 15 are attenuated in the present dynamic damper device 7, torque fluctuations of the turbine 15 partially increase in the vicinity of the intended rotational speed targeted by the present dynamic damper device 7.

However, in the present dynamic damper device 7, when the damper plate 51 is rotated while each third torsion spring 60 is held by each first window part 66 and each second window part 76 of the inertia rings 57, each third torsion spring 60 and both each first window part 66 and each second window part 76 of the inertia rings 57 slide against each other, whereby a hysteresis torque is generated. Thus, in the present dynamic damper device 7, the partially increased secondary torque fluctuations T2 of the turbine 15 can be also attenuated by the hysteresis torque.

In the present dynamic damper device 7, the primary torque fluctuations T1 of the turbine 15 can be directly attenuated, and simultaneously, the secondary torque fluctuations T2, occurring by attenuation of the primary torque fluctuations T1, can be also attenuated. In other words, in the present dynamic damper device 7, torque fluctuations of the turbine 15 of the torque converter 1 can be effectively reduced.

(2) In the present dynamic damper device 7, the hysteresis torque is set to be greater than or equal to 2 Nm and less than or equal to 30 Nm. Hence, compared to a well-known type of dynamic damper device 7, the secondary torque fluctuations T2, subsidiarily occurring in the turbine 15 of the torque converter 1, can be effectively attenuated in a high rotational speed range.

(3) In the present dynamic damper device 7, the inertia of the inertia rings 57 is smaller than that of the turbine 15 of the torque converter 1. For example, when the inertia of the inertia rings 57 is increased, it is possible to enhance an attenuation effect to be exerted on the primary torque fluctuations T1 in the intended rotational speed. On the other hand, it is concerned that the secondary torque fluctuations T2 in the vicinity of the intended rotational speed increases with increase in inertia of the inertia rings 57. Therefore, it is effective to set the inertia of the inertia rings 57 to be smaller than that of the turbine 15 in order to attenuate the primary torque fluctuations T1 without, as much as possible, increasing the secondary torque fluctuations T2. In other words, with this configuration, it is possible to inhibit increase in secondary torque fluctuations T2 occurring in attenuation of the primary torque fluctuations T1.

(4) In the present dynamic damper device 7, each third torsion spring 60 is held only by each first window part 66 and each second window part 76 of the inertia rings 57 on both sides of the damper plate 51, while being disposed in each spring placement part 53 of the damper plate 51. Accordingly, a hysteresis torque can be stably generated while each third torsion spring 60 is reliably held by each first window part 66 and each second window part 76 of the inertia rings 57.

(5) In the present dynamic damper device 7, a hysteresis torque can be more stably generated on the outer peripheral side circular-arc flange part 67a, 77a and the inner peripheral side circular-arc flange part 68a, 78a of each first window part 66 and each second window part 76 of the inertia rings 57, while each third torsion spring 60 is reliably held by the outer peripheral side corner flange parts 67b, 77b and the inner peripheral side corner flange parts 68b, 78b of each first window part 66 and each second window part 76 of the inertia rings 57.

(6) In the present dynamic damper device 7, when the inertia rings 57 are rotated relatively to the damper plate 51, each third torsion spring 60 is pressed by the opening edges 63a of each spring placement part 53 of the damper plate 51, while being held by each first window part 66 and each second window part 76 of the inertia rings 57. Accordingly, each third torsion spring 60 is compressed. Here, each opening edge 63a is formed along the straight line C1 extending from the rotational center in the radial direction. Therefore, each third torsion spring 60, when pressed by the opening edges 63a, becomes likely to deflect in a direction separating from the rotational center and slides against each first window part 66 and each second window part 76 of the inertia rings 57. Accordingly, a hysteresis torque can be more stably generated.

[Other Exemplary Embodiments]

The present disclosure is not limited to the aforementioned exemplary embodiment, and a variety of changes or modifications can be made without departing from the scope of the present disclosure.

(A) The aforementioned exemplary embodiment has exemplified the configuration that the lock-up device 5 includes the first torsion springs 45 and the second torsion springs 46. However, the configuration of the lock-up device 5 is not limited to that of the aforementioned exemplary embodiment, and may be arbitrarily set.

(B) The aforementioned exemplary embodiment has exemplified the configuration that the clutch part 31 includes the plural friction members 34 (the first friction members 34a and the second friction members 34b). However, the configuration of the clutch part 31 is not limited to that of the aforementioned exemplary embodiment, and may be arbitrarily set.

(C) The aforementioned exemplary embodiment has exemplified the configuration that the outer peripheral side circular-arc flange part 67a, 77a and the inner peripheral side circular-arc flange part 68a, 78a of the first flange parts 67 and 68 and the second flange parts 77 and 78 have circular-arc shapes. However, the shapes of the first flange parts 67 and 68 and those of the second flange parts 77 and 78 may be arbitrarily set as long as the aforementioned hysteresis torque can be generated by slide between each third torsion spring 60 and both the first flange parts 67 and 68 and the second flange parts 77 and 78. For example, the shapes of the outer peripheral side circular-arc flange part 67a, 77a and the inner peripheral side circular-arc flange part 68a, 78a may be other than the circular-arc shapes.

(D) The aforementioned exemplary embodiment has exemplified the configuration that each third torsion spring 60 is capable of sliding against both the outer peripheral side circular-arc flange parts 67a and 77a and the inner peripheral side circular-arc flange parts 68a and 78a. Instead of this, the first flange parts 67 and 68 and the second flange parts 77 and 78 may be configured such that each third torsion spring 60 is capable of sliding against only the outer peripheral side circular-arc flange parts 67a and 77a.

Additionally or alternatively, the first flange parts 67 and 68 and the second flange parts 77 and 78 may be configured such that each third torsion spring 60 slides against both the outer peripheral side circular-arc flange parts 67a and 77a and the inner peripheral side circular-arc flange parts 68a and 78a in a low rotational speed range, whereas each third torsion spring 60 slides against only the outer peripheral side corner flange parts 67b and 78b in a high rotational speed range.

REFERENCE SIGNS LIST

1 Torque converter
7 Dynamic damper device
15 Turbine
51 Damper plate
53 Spring placement part
57 Inertia ring
60 Third torsion spring
66 First window part
76 Second window part
O Rotational center

The invention claimed is:

1. A dynamic vibration absorbing device for an automobile, the dynamic vibration absorbing device provided on an output-side member of a torque converter, the dynamic vibration absorbing device comprising:
   a rotary member fixed to the output-side member, the rotary member rotated about a rotational center of the output-side member;
   a mass part including a first accommodation part, the mass part for attenuating vibration of the output-side member by rotating about the rotational center relative to the rotary member; and
   an elastic member held by the first accommodation part, the elastic member elastically coupling the rotary member and the mass part in a rotational direction, the elastic member for generating a hysteresis torque by always contacting with and sliding against a radially outer portion of the first accommodation part in rotation of the rotary member.

2. The dynamic vibration absorbing device according to claim 1, wherein the hysteresis torque is set to be greater than or equal to 2 Nm and less than or equal to 30 Nm.

3. The dynamic vibration absorbing device according to claim 1, wherein the mass part has a smaller mass than the output-side member of the torque converter.

4. The dynamic vibration absorbing device according to claim 1, wherein the rotary member includes a second accommodation part in which the elastic member is capable of being disposed, and the mass part is disposed on both sides of the rotary member in an extending direction of the rotational center.

5. The dynamic vibration absorbing device according to claim 4, wherein the first accommodation part includes a flange part, the flange part holding the elastic member, the flange part slides against the elastic member, and a radially outer portion of the flange part always contacts with and slides against the elastic member.

6. The dynamic vibration absorbing device according to claim 5, wherein a radially inner portion of the flange part further contacts with and slides against the elastic member.

7. The dynamic vibration absorbing device according to claim 4, wherein the second accommodation part includes a contact part with which the elastic member makes contact in the rotational direction, and the contact part is formed along a straight line extending from the rotational center in a radial direction.

8. The dynamic vibration absorbing device according to claim 1, wherein the elastic member generates the hysteresis torque by further contacting with and sliding against a radially inner portion of the first accommodation part in rotation of the rotary member.

9. The dynamic vibration absorbing device according to claim 1, wherein
   the radially outer portion and a radially inner portion of the first accommodation part extends in the rotational direction; and
   the elastic member is arranged in an arc-shape along the radially outer portion and the radially inner portion in the first accommodation part.

* * * * *